United States Patent
Haug et al.

(10) Patent No.: US 12,199,290 B2
(45) Date of Patent: Jan. 14, 2025

(54) FLUOROPOLYMER IONOMERS WITH REDUCED CATALYST POISONING AND ARTICLES THEREFROM

(71) Applicant: 3M INNOVATIVE PROPERTIES COMPANY, St. Paul, MN (US)

(72) Inventors: Andrew T. Haug, Woodbury, MN (US); John E. Abulu, Woodbury, MN (US); Matthew J. Lindell, Woodbury, MN (US); Tyler S. Matthews, Apple Valley, MN (US); Andrew J. L. Steinbach, Shoreview, MN (US); Fuxia Sun, Woodbury, MN (US); Michael A. Yandrasits, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 685 days.

(21) Appl. No.: 17/288,021

(22) PCT Filed: Oct. 25, 2019

(86) PCT No.: PCT/IB2019/059181
§ 371 (c)(1),
(2) Date: Apr. 23, 2021

(87) PCT Pub. No.: WO2020/128659
PCT Pub. Date: Jun. 25, 2020

(65) Prior Publication Data
US 2021/0384523 A1     Dec. 9, 2021

Related U.S. Application Data

(60) Provisional application No. 62/783,395, filed on Dec. 21, 2018.

(51) Int. Cl.
*H01M 4/92* (2006.01)
*C09D 127/18* (2006.01)
(Continued)

(52) U.S. Cl.
CPC .......... *H01M 4/925* (2013.01); *C09D 127/18* (2013.01); *C09D 141/00* (2013.01); *H01M 4/8668* (2013.01); *H01M 4/8828* (2013.01)

(58) Field of Classification Search
CPC .............. H01M 4/925; H01M 4/8668; H01M 4/8828; H01M 2008/1095;
(Continued)

(56) References Cited

U.S. PATENT DOCUMENTS

| 2,532,011 A | 11/1950 | Dahlquist |
| 4,313,988 A | 2/1982 | Koshar |

(Continued)

FOREIGN PATENT DOCUMENTS

| CN | 105051957 A | 11/2015 |
| EP | 250248 | 11/1997 |

(Continued)

OTHER PUBLICATIONS

Kodama, "Catalyst Poisoning Property of Sulfonamide Acid Ionomer on Pt(111) Surface", ECS Transactions, 2013, vol. 58, No. 1, pp. 363-368.

(Continued)

*Primary Examiner* — Tamra L. Dicus
(74) *Attorney, Agent, or Firm* — Julie Lapos-Kuchar (57) ABSTRACT

Described herein is a coating composition comprising: (a) a metal catalyst, wherein the metal catalyst comprises at least one of platinum, ruthenium, iridium, and alloys and combinations thereof; (b) an at least highly fluorinated ionomer comprising a polymer backbone and a plurality of first side chains pendant therefrom, wherein the first side chain comprises at least one protogenic group, wherein the protogenic group is selected from a sulfonic acid, a bis(sulfonyl)imide, a sulfonamide, a sulfonyl methide, and salts and combinations thereof, and wherein the polymer backbone comprises (Continued)

an average of at least 14 carbon atoms between adjacent first side chains along the polymer backbone; and (c) a solvent. Such coating compositions may be used to make electrodes for electrochemical cells and have been shown to have reduced poisoning of the catalyst.

21 Claims, 1 Drawing Sheet

(51) Int. Cl.
  *C09D 141/00* (2006.01)
  *H01M 4/86* (2006.01)
  *H01M 4/88* (2006.01)

(58) Field of Classification Search
  CPC ............ H01M 2300/0082; H01M 4/92; C09D 127/18; C09D 141/00; Y02E 60/50
  See application file for complete search history.

(56) References Cited

U.S. PATENT DOCUMENTS

| | | | |
|---|---|---|---|
| 4,482,687 A | 11/1984 | Noshay | |
| 5,082,706 A | 1/1992 | Tangney | |
| 5,338,430 A | 8/1994 | Parsonage | |
| 5,578,381 A | 11/1996 | Hamada | |
| 5,879,827 A | 3/1999 | Debe | |
| 5,879,828 A | 3/1999 | Debe | |
| 6,040,077 A | 3/2000 | Debe | |
| 6,136,412 A | 10/2000 | Spiewak | |
| 6,319,293 B1 | 11/2001 | Debe | |
| 6,482,763 B2 | 11/2002 | Haugen | |
| 6,624,328 B1 | 9/2003 | Guerra | |
| 7,348,088 B2 | 3/2008 | Hamrock | |
| 9,419,300 B2 | 8/2016 | Hamrock | |
| 2004/0116742 A1 | 6/2004 | Guerra | |
| 2004/0197569 A1* | 10/2004 | Jing | C09J 11/06 524/367 |
| 2007/0072975 A1* | 3/2007 | Chandler | C08K 3/22 524/544 |
| 2009/0169949 A1 | 7/2009 | Hicks | |
| 2009/0220840 A1* | 9/2009 | Yamaguchi | H01B 1/122 977/773 |
| 2013/0029249 A1 | 1/2013 | Hamrock | |
| 2013/0245219 A1* | 9/2013 | Perry | C08F 216/1475 526/243 |
| 2013/0252134 A1* | 9/2013 | Takami | H01M 8/1027 521/38 |
| 2013/0253157 A1 | 9/2013 | Takami | |
| 2015/0030962 A1* | 1/2015 | Hommura | H01B 1/122 521/38 |
| 2015/0236354 A1 | 8/2015 | Binder et al. | |
| 2017/0331119 A1* | 11/2017 | Kitao | H01M 4/8673 |
| 2017/0365870 A1 | 12/2017 | Schaberg | |

FOREIGN PATENT DOCUMENTS

| | | |
|---|---|---|
| JP | 2004-281305 A | 10/2004 |
| JP | 2007-157453 A | 6/2007 |
| JP | 2011-258349 A | 12/2011 |
| JP | 2014-502776 A | 2/2014 |
| WO | WO 2018-185616 | 10/2018 |
| WO | WO 2018-226444 | 12/2018 |

OTHER PUBLICATIONS

Shinozaki, "Oxygen Reduction Reaction Measurements on Platinum Electrocatalysts Utilizing Rotating Disk Electrode Technique", Journal of the Electrochemical Society, 2015, vol. 162, col. 10. pp. F1144-F1158.

Subbaram, "Three Phase Interfaces at Electrified Metal-Solid Electrolyte Systems 1. Study of the Pt(hkl)—Nafion Interface", The Journal of Physical Chemistry C, 2010, vol. 114, No. 18, pp. 8414-8422.

International Search Report for PCT International Application No. PCT/IB2019/059181, mailed on Nov. 28, 2019, 5 pages.

* cited by examiner

FLUOROPOLYMER IONOMERS WITH REDUCED CATALYST POISONING AND ARTICLES THEREFROM

This invention was made with Government support under Cooperative Agreement DE-EE0007650 awarded by DOE. The Government has certain rights in this invention.

TECHNICAL FIELD

An electrode catalyst and fluorinated ionomer-containing composition is disclosed along with articles therefrom, wherein the resulting electrodes have reduced catalyst poisoning. Such electrodes may be used in electrochemical devices.

BACKGROUND

Electrochemical devices, including proton exchange membrane fuel cells (PEMFCs), sensors, electrolyzers, chlor-alkali separation membranes, and the like, have been constructed from membrane electrode assemblies (MEAs). Such MEAs typically comprise an ion conducting membrane sandwiched between two electrodes, a cathode and an anode to form a 3-layer MEA (also known as a catalyst coated membrane or CCM). The ion conducting membrane transports ions that are formed at one electrode to the other, allowing electronic current to flow in an external circuit connecting the electrodes.

Hydrogen/oxygen fuel cells are one type of electrochemical device, which generates electrical power when supplied with hydrogen and oxygen. Hydrogen/oxygen fuel cells are typically formed by placing the 3-layer MEA between two porous, electrically conducting elements called gas diffusion layer (GDLs), to form a 5-layer MEA. A typical 5-layer MEA for use in a hydrogen/oxygen fuel cell might comprise a first GDL, a first electrode portion, an ion conducting membrane containing a proton-exchange electrolyte, a second electrode portion, and a second GDL. Such a five-layer MEA can be used to generate electricity by oxidization of hydrogen and reduction of oxygen. In other embodiments, the oxygen is provided by air.

SUMMARY

It is commonly known in hydrogen/oxygen fuel cells that fluorinated ion conducting polymers reduce catalytic activity by 'poisoning' the catalyst. Thus, there is a desire to identify electrode compositions which have reduced catalyst poisoning.

In one aspect, use of a highly fluorinated ionomer to reduce poisoning of a metal catalyst in an electrochemical cell electrode is described, wherein the metal catalyst comprises at least one of platinum, ruthenium, iridium, and alloys and combinations thereof; and an at least highly fluorinated ionomer comprising a polymer backbone and a plurality of first side chains pendant therefrom, wherein the first side chain comprises at least one protogenic group, wherein the protogenic group is selected from a sulfonic acid, a bis(sulfonyl)imide, a sulfonamide, a sulfonyl methide, and salts and combinations thereof, and wherein the polymer backbone comprises an average of at least 14 carbon atoms between adjacent first side chains along the polymer backbone.

In another aspect, a coating composition is described. The composition comprising:
(a) a metal catalyst, wherein the metal catalyst comprises at least one of platinum, ruthenium, iridium, and alloys and combinations thereof;
(b) an at least highly fluorinated ionomer comprising a polymer backbone and a plurality of first side chains pendant therefrom, wherein the first side chain comprises at least one protogenic group, wherein the protogenic group is selected from a sulfonic acid, a bis(sulfonyl)imide, a sulfonamide, a sulfonyl methide, and salts and combinations thereof, and wherein the polymer backbone comprises an average of at least 14 carbon atoms between adjacent first side chains along the polymer backbone; and
(c) a solvent In yet another embodiment, article is described, the article comprising a substrate with an electrode coating thereon, wherein the electrode coating comprises (a) a metal catalyst layer, wherein the metal catalyst layer comprises at least one of platinum, ruthenium, iridium, and alloys and combinations thereof, (b) an at least highly fluorinated ionomer layer comprising a polymer backbone and a plurality of first side chains pendant therefrom, wherein the first side chain comprises at least one of a sulfonic acid, a bis(sulfonyl)imide, a sulfonamide, a sulfonyl methide, and salts and combinations thereof, and wherein the polymer backbone comprises an average of at least 14 carbon atoms between adjacent first side chains along the polymer backbone.

In one embodiment, the use of the article described above as a cathode in a fuel cell is provided, wherein the catalyst is platinum. In another embodiment, the use of the article described above as an anode in an electrolyzer is provided, wherein the catalyst is substantially free of platinum.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B);
"highly fluorinated" refers to a compound wherein at least 75%, 80%, 85%, 90%, 95%, or even 99% of the C—H bonds are replaced by C—F bonds, and the remainder of the C—H bonds are selected from C—H bonds, C—Cl bonds, C—Br bonds, and combinations thereof, "perfluorinated" means a group or a compound wherein all carbon-hydrogen bonds have been replaced by carbon-fluorine bonds. A perfluorinated compound may contain other atoms than fluorine and carbon atoms, like oxygen atoms, nitrogen atoms, chlorine atoms, bromine atoms and iodine atoms; and "substituted" means, for a chemical species, substituted by conventional substituents which do not interfere with the desired product or process, e.g., substituents can be alkyl, alkoxy, aryl, phenyl, halo (F, Cl, Br, I), cyano, nitro, etc.; and "discrete" refers to distinct elements, having a separate identity, but does not preclude elements from being in contact with one another.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

As an example for a fuel cell, the cathode electrode is commonly composed of ion conducting polymer (ionomer), catalyst material (commonly Pt and Pt-alloys), and conductive material (carbon). Further, it is common to disperse catalyst on a conductive support such as carbon. In a typical PEMFC, the oxygen is reduced on the cathode electrode side. Oxygen typically moves from the cathode flowfield through the cathode GDL and into the cathode electrode. Similarly, electrons conduct through the cathode flowfield, cathode GDL and into the cathode electrode. Protons move through the membrane into the cathode electrode. At each cathode catalyst site, protons, electrons and oxygen react to form water. There is a reaction overpotential at the cathode for this reaction, giving rise to a loss in fuel cell efficiency. The greater this overpotential, the less efficiently the cathode (and PEMFC) operates. It is known that the ionomer in the cathode contributes to this reaction overpotential and efficiency loss. Further, it is known that the ionomer "poisons" the cathode catalyst metal, creating additional efficiency losses in the cathode reaction and the PEMFC. Therefore, materials, such as ionomers, that might reduce this catalyst poisoning would be of great benefit to the electrochemical and fuel cell industries.

The present disclosure is directed toward electrode catalyst and ionomer-containing coating compositions and articles made therefrom. Such electrode catalyst and ionomer-containing coating compositions comprise a metal catalyst and an at least highly fluorinated ionomer, wherein the at least highly fluorinated ionomer is selected to reduce catalyst poisoning.

The ionomer of the present disclosure is highly fluorinated or even perfluorinated and comprises a plurality of first side chains along the polymer backbone. Ideally, the ionomer is perfluorinated, however in some embodiments the ionomer is highly fluorinated comprising C—H bonds at the terminal ends of the polymer, where the polymerization reaction is initiated or terminated. These first side chains along the ionomer backbone comprise at least one protogenic group and at least one perfluorinated carbon. A protogenic group is a group which is able to donate a proton or hydrogen ion. Exemplary protogenic groups include: sulfonic acid, a bis(sulfonyl)imide, a sulfonamide, a sulfonyl methide, and salts thereof. If the first side chain comprises one than one protogenic group, the protogenic groups may be the same or different. In one embodiment, the ionomer comprises the same protogenic groups. In another embodiment, the ionomer comprises different protogenic groups.

A reduction in catalyst poisoning is observed when these first side chains having an average of at least 14, 16 or even 18 carbon atoms apart along the polymer backbone compared to similar materials with protogenic side chains having an average of less than 14 carbons apart. For example, an ionomer of the present disclosure has the following segment:

wherein "*" is where the segment is connected along the polymer backbone. The segment comprises two first side chains terminated by a sulfonic acid group. In the segment disclosed above, the two first side chains are fourteen carbon atoms apart.

The first side chains comprises at least one perfluorinated carbon, which is interrupted by and/or terminated by a protogenic group. In one embodiment, the first side chain comprises on average at least 2, 4, or even 6 carbon atoms, and most 10, 12, 14, 16, 18 or even 20, excluding the carbon located along the polymer backbone. In one embodiment, the first side chain comprises at least one catenary heteroatom, such as oxygen (i.e., ether linkage).

The first side chain comprises at least one protogenic group. In one embodiment, the first side chain may comprise a plurality of protogenic groups, for example, 2, 3 or 4, or more protogenic groups such as a bis(perfluoroalkyl)sulfonimide terminated with a sulfonic acid salt. See for example U.S. Pat. No. 9,419,300 (Hamrock et al.) and U.S. Pat. Publ. No. 2017/0365870 (Schaberg et al.), which are both herein incorporated by reference.

In one embodiment, the first side chain is of the formula —O—(Rf)—SO$_3$Y wherein Rf is a divalent perfluorinated alkyl group, which can be linear or branched and optionally comprises at least one ether; and Y is H or a suitable counterion.

Exemplary protogenic first side chains include:
- —O—(CF$_2$)$_m$(OCF)$_n$(CF$_2$)$_x$SO$_3$Y where m is 2, 3, 4, 5, or 6; n is 0 or 1; x is 0 or 1;
- —O—(CF$_2$)$_m$—SO$_3$Y wherein m is 2, 3, 4, 5, or 6;
- —O—(CF$_2$CFCF$_3$—O)$_x$—CF$_2$(CF$_2$)$_n$—SO$_3$Y wherein x is 0, 1, 2, or 3; and n is 1, 2, 3, or 4;
- —O—(CF$_2$)$_m$—O—CF(CF$_2$—SO$_3$Y)$_2$ wherein m is 2, 3, 4, 5, or 6;
- —O—(CF$_2$)$_m$—SO$_2$NZ$_2$ wherein m is 2, 3, 4, 5, or 6;
- —O—(CF$_2$)$_m$—SO$_2$NZSO$_2$—(CF$_2$)$_n$—SO$_3$Y wherein m is 2, 3, 4, 5, or 6 and n is 2, 3, 4, 5, or 6;
- —O—(CF$_2$)$_m$—SO$_2$NZSO$_2$—(CF$_2$)$_n$—SO$_2$NH$_2$ wherein m is 2, 3, 4, 5, or 6 and n is 2, 3, 4, 5, or 6;
- —O—(CF$_2$)$_m$—SO$_2$NZSO$_2$—(CF$_2$)$_p$—SO$_2$NZSO$_2$—(CF$_2$)$_n$—SO$_3$Y wherein m is 2, 3, 4, 5, or 6; p is 2, 3, 4, 5, or 6; and n is 2, 3, 4, 5, or 6;
- —O—(CF$_2$)$_m$—SO$_2$NZSO$_2$—(CF$_2$)$_p$—SO$_2$NZSO$_2$—(CF$_2$)$_x$—CF$_3$ wherein m is 2, 3, 4, 5, or 6; p is 2, 3, 4, 5, or 6; and x is 0, 1, 2, 3, 4, 5, or 6; and
- —O—(CF$_2$)$_m$—SO$_2$NZSO$_2$—(CF$_2$)$_x$—CF$_3$ where x is 0, 1, 2, 3, 4, 5, or 6 and m is 2, 3, 4, 5, or 6, and Y is independently selected from the group consisting of H and suitable countercations, and Z is independently selected from the group consisting of H and suitable countercations. Suitable countercations include, for example, alkali metals such as lithium, sodium, potassium, etc.; alkaline earth metals, such as calcium, magnesium, beryllium, etc.; and transition metals such as manganese. In one embodiment, the ionomer may comprise a plurality of second pendant side chains. These second side chains may be randomly located along the polymer backbone, even between adjacent first side chains, and are not protogenic. In one embodiment, the second side chain comprises at least one perfluorinated alkyl group (e.g., perfluorinated methyl), perfluorinated alkyl ether (e.g., —O—$(CF_2)_x CF_3$ where x is 0 or 1), and/or perfluorinated alkyl polyether (e.g., —O—$(CF_2)_3$—O—$CF_3$). In another embodiment, the ionomer is made from the acidification of pendant sulfonyl fluoride groups of a perfluoropolymer. Thus, in one embodiment, these second side chains may comprise sulfonyl fluoride groups. In one embodiment, an ionomer comprising first and second side chains has the following segment:

Wherein "*" is where the segment is connected along the polymer backbone. The segment comprises two first side chains, represented as wavy lines terminated by a sulfonate ion and a second side chain of a perfluorinated methyl group. The wavy line represents an unspecified portion of the side chain. In the segment disclosed above, the two first side chains are fourteen carbon atoms apart.

The ionomer is a polymer. In one embodiment, the ionomer comprises at least 20, 50, 100, 500, or even 1000 repeat units.

Exemplary ionomers include: perfluorosulfonic acid (e.g., Nafion); perfluorosulfonimide-acid (PFIA); perfluoro-X-imide, where X may be, but is not limited to, methyl, butyl (PFBI), propyl, phenyl, etc.; and bis(sulfonyl)imides terminated with perfluorinated alkyl groups.

In one embodiment, the ionomer has a conductivity of at least 10, 20, or even 30 mS/cm and a most 50, 60, 70, 80, 80, or even 100 mS/cm at 50% relative humidity (RH) and 80° C.

Commercially available ionomers include those available, for example, under the trade designation "DYNEON" from 3M Company, St. Paul, MN; "NAFION" from DuPont Chemicals, Wilmington, DE; "FLEMION" from Asahi Glass Co., Ltd., Tokyo, Japan; "ACIPLEX" from Asahi Kasei Chemicals, Tokyo, Japan; as well as those available from ElectroChem, Inc., Woburn, MA and Aldrich Chemical Co., Inc., Milwaukee, WI).

The metal catalyst comprises at least one of platinum, ruthenium, iridium, and alloys and combinations thereof. The iridium may be an iridium-containing compound such as iridium oxide, $IrO_x$, where x may be in the range from 0-2. The ruthenium may be a ruthenium-containing compound such as ruthenium oxide. In one embodiment, the metal catalyst of platinum, ruthenium, and/or iridium, may be an alloy or intimate mixture with a metal such as a transition metal consisting of Group IV, Group VIb, Group VIIb, and Group VIIIb (other than Pt, Ir, and Ru). Exemplary metals include, nickel, cobalt, hafnium, titanium, zirconium, and manganese. Exemplary alloys include PtIr, PtRu, PtXIr, where X may be hafnium, titanium, and zirconium. Exemplary metal catalysts include Pt+Ir, Pt+IrX, PtX+Ir, PtTi+Ir, PtX+IrY, where X may be gold, hafnium, titanium, and zirconium and Y is gold, hafnium, titanium, and zirconium. In some embodiments, the atomic ratio of the combined Pt, Ir, and Ru to the other transition metal is 5:95 to 95:5, 10:90 to 90:10, 20:80 to 80:20, 30:70 to 70:30 or even 40:60 and 60:40. In some embodiments, the weight ratio of platinum to the collective weight of iridium and/or ruthenium can range from 1000:1 to 1:1, 500:1 to 1:1, 250:1 to 1:1, 100:1 to 1:1, 50:1 to 1:1, 25:1 to 1:1, 10:1 to 1:1, 5:1 to 1:1, 2.5:1 to 1:1, 1000:1 to 2.5:1, 1000:1 to 5:1, 1000:1 to 10:1, 1000:1 to 25:1, 1000:1 to 50:1, 1000:1 to 100:1, 1000:1 to 250:1, 1000:1 to 500:1, and 10:3 to 4:3.

In one embodiment, the ratio of ionomer to the catalyst is at least 0.01, 0.1, 1, or even 5 parts by weight to at most 10, 15, or even 20 parts by weight of the ionomer per 1 part by weight of the metal catalyst.

In one embodiment, the coating compositions disclosed herein comprises an additive. Such additives may include a support such as carbon particles, acicular particles, or a metal organic framework; carbon particles, and/or a hydrophobic polymer.

In one embodiment, the metal catalyst is disposed on the support such as acicular particles or a metal organic framework. For example, acicular particles are discrete elongated particles comprising a plurality of microstructured cores, wherein at least one portion of the surface of the microstructured core comprises a layer of metal catalyst. Such acicular particles and their construction are known in the art see for example, U.S. Pat. No. 5,338,430 (Parsonage et al.); U.S. Pat. No. 5,879,827 (Debe et al.); U.S. Pat. No. 5,879,828 (Debe et al.); U.S. Pat. No. 6,040,077 (Debe et al.); and U.S. Pat. No. 6,319,293 (Debe et al.); U.S. Pat. No. 6,136,412 (Spiewak et al.); and U.S. Pat. No. 6,482,763 (Haugen et al.), herein incorporated by reference.

In one embodiment, the metal catalyst is disposed on at least one surface (more preferably at least two or even three surfaces) of the plurality of microstructured cores. The metal catalyst is disposed as a continuous layer across the surface such that electrons can continuously move from one portion of the acicular particle to another portion of the acicular particle.

In one embodiment, the thickness of the layer of metal catalyst on the surface of the microstructured core can vary, but typically ranges from at least 0.3, 0.5, 1, or even 2 nm; and no more than 5, 10, 20, 40, 60, or even 100 nm on the sides of the microstructured cores.

The carbon particles disclosed herein are those materials that comprise predominately (e.g., greater than 90, 95, 99% mole) elemental carbon in the bulk.

Although, not wanting to be limited by theory, it is believed that these carbon particles improve the conductivity of the metal catalyst; and additionally, or alternatively, these carbon particles create pores enabling enhanced transport of, for example, gas and water through the electrode.

The carbon particles may include amorphous carbons, crystalline carbons, graphitized carbons, and combinations thereof. Exemplary carbons include, elemental carbon, carbon black, acetylene black, graphite, graphene, graphitized carbon, carbon nanotubes, TKK F-type carbon, P-type carbon, graphitized Vulcan, graphitized carbon, and specialty carbon black such as those available under the trade designations "VULCAN XC 72" from Cabot Corp, Billerica, MA and the graphitized versions thereof, and those available under the trade designation "KETJENBLACK EC-600JD"

by AkzoNobel Chemicals Co., Amsterdam, Netherlands and the graphitized versions thereof The scope of useful carbon particles in this disclosure is not intended to be limited to the specific examples indicated hereinabove, but is intended to include all useful physical forms of carbons, such as powders, plates, rods, foams, felts, fibers, branched fibers, cloths, etc.

In one embodiment, the carbon particles have an average length of a major axis less than 100, 75, or even 50 nm in diameter. In one embodiment, the carbon particles have an average length of a major axis of greater than 10, 15, or even 20 nm, and less than 70, 60, or even 50 nm.

In one embodiment, the ratio of the carbon particles to the acicular particles is 1:100 to 100:1.

In one embodiment, the ratio of the carbon particles to the ionomer is 5:1 to 0.1:1, more preferably 2:1 to 0.5:1.

In one embodiment, precious metal-free (no Pt, Ir or Au) catalysts known as metal organic frameworks may be used with or without carbon supports. These catalysts commonly consist of iron-nitrogen and carbon bonded frameworks.

In one embodiment, a hydrophobic particle or polymer such as fluorinated polymer is added to the coating composition. Exemplary fluorinated polymers include: polytetrafluoroethylene; FEP (a copolymer of hexafluoropropylene and tetrafluoroethylene); polyvinylidene fluoride; perfluoroalkoxy polymer; copolymers of ethylene and tetrafluoroethylene; copolymers of vinylidene fluoride, hexafluoroethylene, and tetrafluoroethylene; and copolymers of tetrafluoroethylene and norbornene such as that available under the trade designation "TEFLON AF" from The Chemours Co., Wilmington, DE In one embodiment, the ratio of the hydrophobic particle or polymer to the ionomer is 0.01:1 to 100:1, more preferably 0.01:1 to 2:1.

Typically, the metal catalyst is applied along with the ionomer, various solvents, and optionally the support and/or hydrophobic polymer in the form of a dispersion, for example, as a spray, an ink or a paste.

In one embodiment, the ionomer, and metal catalyst, optionally including a support, are dispersed in a solvent. The solvent can include water, ketones (such as acetone, tetrahydrofuran, methyl ethyl ketone, and cyclohexanone), alcohols (such as methanol, isopropanol, propanol, ethanol, and propylene glycol butyl ether), polyalcohols (such as cycloglycerin and ethylene glycol); hydrocarbons (such as cyclohexane, heptane, and octane), dimethyl sulfoxide, and fluorinated solvents such as heptadecafluorooctane sulfonic acid and partially fluorinated or perfluorinated alkanes or tertiary amines (such as those available under the trade designations "3M NOVEC" or "3M FLUORINERT" fluids from 3M Co., St. Paul, MN). In one embodiment, the coating composition is an aqueous dispersion, optionally comprising additional solvents and/or a dispersant.

In one embodiment, the coating composition contains 1-40 wt % solids (i.e., ionomer, metal catalyst, optional support and optional hydrophobic polymer) and more typically 10-25 wt % solids.

In one embodiment, the coating composition may include a low amount of high boiling solvent such as those disclosed in U.S. Appl. No. 2009/0169949 (Hicks et al.), herein incorporated by reference. These solvents are higher boiling compounds, having a boiling point greater than 120, 140, 160, or even 180° C. Useful high boiling solvents may include non-fluorinated alkanes, alkenes, amines, ethers, or aromatic compounds which may optionally be substituted. Useful high boiling solvents may include partially, highly or fully fluorinated alkanes, alkenes, amines, ethers, or aromatic compounds, which may optionally be substituted. Useful high boiling solvent may include fluorinated solvents such as partially or fully fluorinated alkanes or tertiary amines such as those available under the trade designations "3M NOVEC ENGINEERED FLUID" or "3M FLUORINERT ELECTRONIC LIQUID", available from 3M Company, St. Paul, MN; or non-fluorinated ethers such as propylene glycol butyl ether. In some embodiments, the coating composition according to the present disclosure contains 0.1-50%, more preferably 1-10% by weight of a high boiling solvent.

In one embodiment, the coating composition disclosed above are applied onto a substrate such as a polymer electrolyte membrane (PEM) or a gas diffusion layer (GDL); or a transfer substrate and subsequently transferred onto a PEM or GDL to form, for example, an electrode.

PEMs are known in the art. PEMs may comprise any suitable polymer electrolyte. The polymer electrolytes typically bear anionic functional groups bound to a common backbone, which are typically sulfonic acid groups but may also include carboxylic acid groups, imide groups, amide groups, bis(sulfonyl)imide, sulfonamide, or other acidic functional groups. The polymer electrolytes are typically highly fluorinated and most typically perfluorinated. Exemplary polymer electrolytes include those mentioned for the ionomer above. The polymer electrolytes are typically cast as a film (i.e. membrane) having a thickness of less than 50 microns, more typically less than 40 microns, more typically less than 30 microns, in some embodiments less than 25 microns, and in some embodiments about 15 microns. The PEM may consist of the polymer electrolyte or the polymer electrolyte may be imbibed into a porous support (such as PTFE). Examples of known PEMs include those available under the trade designations: "NAFION PFSA MEMBRANES" by E.I. du Pont de Nemours and Co., Wilmington, DE; "GORESELECT MEMBRANE" by W.L. Gore & Associates, Inc., Newark, DE; "ACIPLEX" by Asahi Kasei Corp., Tokyo, Japan; and 3M Co.

GDLs are also known in the art. Typically, the GDL is a carbon fiber sheet material selected from woven and nonwoven carbon fiber constructions. Carbon fiber constructions which may be useful in the practice of the present disclosure may include those available under the trade designations "TORAY CARBON PAPER", "SPECTRACARB CARBON PAPER", "AFN" non-woven carbon cloth, "ZOLTEK CARBON CLOTH", Mitsubishi Rayon Corp. carbon papers, and the like. The GDL may be coated or impregnated with various materials, including carbon particle coatings, hydrophilizing treatments, and hydrophobizing treatments such as coating with polytetrafluoroethylene (PTFE).

Transfer substrates are a temporary support that is not intended for final use of the electrode and is used during the manufacture or storage to support and/or protect the electrode. The transfer substrate is removed from the electrode article prior to use. The transfer substrate comprises a backing often coated with a release coating. The electrode is disposed on the release coating, which allows for easy, clean removal of the electrode from the transfer substrate. Such transfer substrates are known in the art. The backing often is comprised of PTFE with or without a release coating, polyiimde, polyethylene terephthalate, polyethylene naphthalate (PEN), polyester, and similar materials.

Examples of release agents include carbamates, urethanes, silicones, fluorocarbons, fluorosilicones, and combinations thereof. Carbamate release agents generally have long side chains and relatively high softening points. An exemplary carbamate release agent is polyvinyl octadecyl carbamate, available from Anderson Development Co. of Adrian, Mich., under the trade designation "ESCOAT P20", and from Mavzo Inc. of Norcross, Ga., marketed in various grades as RA-95H, RA-95HS, RA-155 and RA-585S.

Illustrative examples of surface applied (i.e., topical) release agents include polyvinyl carbamates such as disclosed in U.S. Pat. No. 2,532,011 (Dahlquist et al.), reactive silicones, fluorochemical polymers, epoxysilicones such as are disclosed in U.S. Pat. No. 4,313,988 (Bany et al.) and U.S. Pat. No. 4,482,687 (Kessel et al.), polyorganosiloxane-polyurea block copolymers such as are disclosed in European Appl. No. 250,248 (Leir et al.), etc.

Silicone release agents generally comprise an organopolysiloxane polymer comprising at least two crosslinkable reactive groups, e.g., two ethylenically-unsaturated organic groups. In some embodiments, the silicone polymer comprises two terminal crosslinkable groups, e.g., two terminal ethylenically-unsaturated groups. In some embodiments, the silicone polymer comprises pendant functional groups, e.g., pendant ethylenically-unsaturated organic groups. In some embodiments, the silicone polymer has a vinyl equivalent weight of no greater than 20,000 grams per equivalent, e.g., no greater than 15,000, or even no greater than 10,000 grams per equivalent. In some embodiments, the silicone polymer has a vinyl equivalent weight of at least 250 grams per equivalent, e.g., at least 500, or even at least 1000 grams per equivalent. In some embodiments, the silicone polymer has a vinyl equivalent weight of 500 to 5000 grams per equivalent, e.g., 750 to 4000 grams per equivalent, or even 1000 to 3000 grams per equivalent.

Commercially available silicone polymers include those available under the trade designations "DMS-V" from Gelest Inc., e.g., DMS-V05, DMS-V21, DMS-V22, DMS-V25, DMS-V31, and DMS-V33. Other commercially available silicone polymers comprising an average of at least two ethylenically-unsaturated organic groups include "SYL-OFF 2-7170" and "SYL-OFF 7850" (available from Dow Corning Corporation), "VMS-T11" and "SIT7900" (available from Gelest Inc.), "SILMER VIN 70", "SILMER VIN 100" and "SILMER VIN 200" (available from Siltech Corporation), and 2,4,6,8-tetramethyl-2,4,6,8-tetravinylcyclotetrasiloxane (available from Aldrich).

The release agent may also comprise a fluorosilicone polymer. Commercially available ethylenicaly unsaturated fluorosilicone polymers are available from Dow Corning Corp. (Midland, Mich.) under the SYL-OFF series of trade designations including, e.g, "SYL-OFF FOPS-7785" and "SYL-OFF FOPS-7786" Other ethylenically unsaturated fluorosilicone polymers are commercially available from General Electric Co. (Albany, N.Y.), and Wacker Chemie (Germany). Additional useful ethylenically unsaturated fluorosilicone polymers are described as component (e) at column 5, line 67 through column 7, line 27 of U.S. Pat. No. 5,082,706 (Tangney). Fluorosilicone polymers are particularly useful in forming release coating compositions when combined with a suitable crosslinking agent. One useful crosslinking agent is available under the trade designation "SYL-OFF Q2-7560" from Dow Corning Corp. Other useful crosslinking agents are disclosed in U.S. Pat. No. 5,082,706 (Tangney) and U.S. Pat. No. 5,578,381 (Hamada et al.).

The coating composition may be initially mixed together in an spray, ink, paste or dispersion. As such, the coating composition may then be applied to a PEM, GDL, or transfer article in one or multiple layers, with each layer having the same composition or with some layers having differing compositions. Coating techniques as known in the art may be used to coat the electrode composition onto a substrate. Exemplary coating methods include knife coating, bar coating, gravure coating, spray coating, etc.

After coating, the coated substrate is typically dried to at least partially remove the solvent from the electrode composition, leaving an electrode layer on the substrate.

The ionomer is used in coating compositions to make a catalyst layer which can be used as an electrode in an electrochemical cell. The electrodes are disposed between the membrane and their corresponding gas diffusion layer. In the case of a fuel cell, protons generated at the anode travel through the membrane, through the cathode and to the gas diffusion layer, where the protons react with the hydrogen input to form water. Thus, the electrode must be able to move protons across the electrode width. Ionomers as used in the electrode act as a binder and enable conduction of the protons. Thus, the ionomers should have a large portion of ionic groups to enable this conduction. However, acids can poison metals such as platinum, reducing their catalytic activity.

The catalyst coated PEM or catalyst coated GDL may be useful in an electrochemical cell such as a fuel cell. Specifically, the catalyst composition of the present disclosure can find particular use in the anode portion of a hydrogen fueled fuel cell.

In one embodiment of the present disclosure, the fuel cell assembly comprises an anode electrode made from the composition of the present disclosure. The MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typically, one face of an ion conducting membrane is in contact with an anode electrode layer and the opposite face is in contact with a cathode electrode layer. In typical use, hydrogen gas is fed to the anode side of the fuel cell, while air, an oxygen source, is fed to the cathode side. During use, protons are formed at the anode via hydrogen oxidation. The protons are transported across the ion conducting membrane to the cathode to react with oxygen, causing electrical current to flow in an external circuit connecting the electrodes. The ion conducting membrane forms a durable, non-porous, electronically non-conductive mechanical barrier between the reactant gases, yet it also passes $H^+$ ions readily. Gas diffusion layers (GDL's) facilitate reactant and product water transport to and from the anode and cathode electrode materials and conduct electrical current. The GDL is both porous and electrically conductive, and is typically composed of carbon fibers. The GDL may also be called a fluid transport layer or a diffuser/current collector. In some embodiments, the anode and cathode electrode layers are applied to GDL's to form catalyst coated backing layers (CCB's) and the resulting CCB's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA. In operation, the five-layer MEA is positioned between to flow field plates to form an assembly and in some embodiments, more than one assembly is stacked together to form a fuel cell stack.

In one embodiment, the coating compositions disclosed herein comprise platinum and can be utilized as a cathode in a fuel cell application. In another embodiment, the coating compositions disclosed herein comprise iridium and can be utilized as an anode in an electrolyzer application.

In typical operation, fuel cells produce electrical power when supplied a fuel such as hydrogen and an oxidant such as oxygen from air. Hydrogen is reduced into hydrogen ions and electrons at the anode electrode. The electrons provide an electrical current to drive an external load and the hydrogen ions pass through the membrane. At the cathode, electrode oxygen combines with the hydrogen ions to form water as a byproduct. Fuel cell operation depends on the degree of transportation of gases, liquids, electrons, and ions through the materials that form the layers of the MEA. Fuel cell durability depends on the selection and integration of materials into the MEA in such a way to prevent degradation or loss of key components, such as catalyst area and efficiency, prevent carbon oxidation and corrosion, and prevent ionomer degradation.

Typically, the cathode contains pores for gas transport, catalyst and optionally carbon for electron transport, and ionomer for proton transport. The types and amounts of these components are optimized to achieve a high performance. It is known that the ionomers impact the performance of the catalyst to varying degrees.

This effect can be seen in Table 2 in the Example Section, where various ionomers have different activity loss. This data is plotted in FIG. 1 as the equivalent weight of the ionomer versus the average number of $-CF_2-$ units between first side chains. The data points correspond to each example or comparative example run and the delta V (dV or activity loss) is reported for each data point. The dashed lines are labeled and represent where ionomers having 1 protogenic group per side chain would trend, where ionomers having two protogenic groups per side chain would trend, and where ionomers having three protogenic groups per side chain would trend. It is also known that ionomers having a lower equivalent weight (in other words more protogenic groups per molecular weight) makes the ionomers more ionically conductive, which is typically advantageous. Thus, when considering membranes for electrochemical cells, generally lower equivalent weight ionomers are preferred. When considering ionomers for use in electrodes, a balance must be struck between conductivity of the ionomer and activity of the catalyst. As clearly shown in the figure, the ionomers having more than 14 carbons between first side chains have a reduced activity loss in the catalyst as compared to the ionomers having an average of less than 14 carbon atoms along the polymer backbone between the first side chains.

Although not wanting to be limited by theory, it is believed that having an average of at least 14 (at least 16, or even 18) carbon atoms linked between the two adjacent first side chains is responsible for the reduction of the catalyst poisoning as compared to the same highly fluorinated ionomer having, on average, less than 14 carbon atoms between the two adjacent first side chains. Generally, the average number of carbons is no more than 18, 20, 22, or even 24 carbon atoms linked between the two adjacent first side chains to ensure adequate conductivity of the ionomer.

The equivalent weight (EW) of an ionomer means the weight of the ionomer which will neutralize one equivalent of base. For two ionomers having the same average repeat unit molecular weight, calculated from the mole ratio of incorporated monomers, the ionomer with the lower equivalent weight will have more protogenic groups than the ionomer with the higher equivalent weight. For example, a polymer having a repeat unit comprising 4 monomeric units derived from TFE ($CF_2=CF_2$) and 1 monomeric unit derived from $CF_2=CFOC_4F_8SO_3H$ will have the same average molecular weight of the repeat unit (780 g/mol) as a polymer made from 1.09 monomeric units derived from TFE and 1 monomeric unit derived from $CF_2=CFOC_4F_8SO_2NHSO_2C_3F_6SO_3H$. However, because $CF_2=CFOC_4F_8SO_2NHSO_2C_3F_6SO_3H$ has 2 protogenic groups, the polymer made with $CF_2=CFOC_4F_8SO_2NHSO_2C_3F_6SO_3H$ will have an equivalent weight of 390 g/mol $H^+$ as compared to the polymer made with $CF_2=CFOC_4F_8SO_3H$ (780 g/mol $H^+$). Traditionally, lower equivalent weight ionomers are more desirable because in an electrode they would typically contain more protogenic groups per volume, and therefore be able to conduct more protons, likely leading to more efficient operation. However, increasing protogenic concentration and/or lower equivalent weights may be generated though different methods. The first is reducing the spacing, or number of carbon groups between sidechains containing a single protogenic group. A second is increasing the number of protonic groups per side chain. Through the second method, the EW may be maintained or even lowered while increasing the distance (number of carbon groups) between protogenic sidechains. In the present disclosure, it has been discovered that ionomers with sidechains further apart (containing more carbon groups in between sidechains) may be more desirable for electrode catalyst compositions to prevent poisoning of the catalyst.

Figure 1:
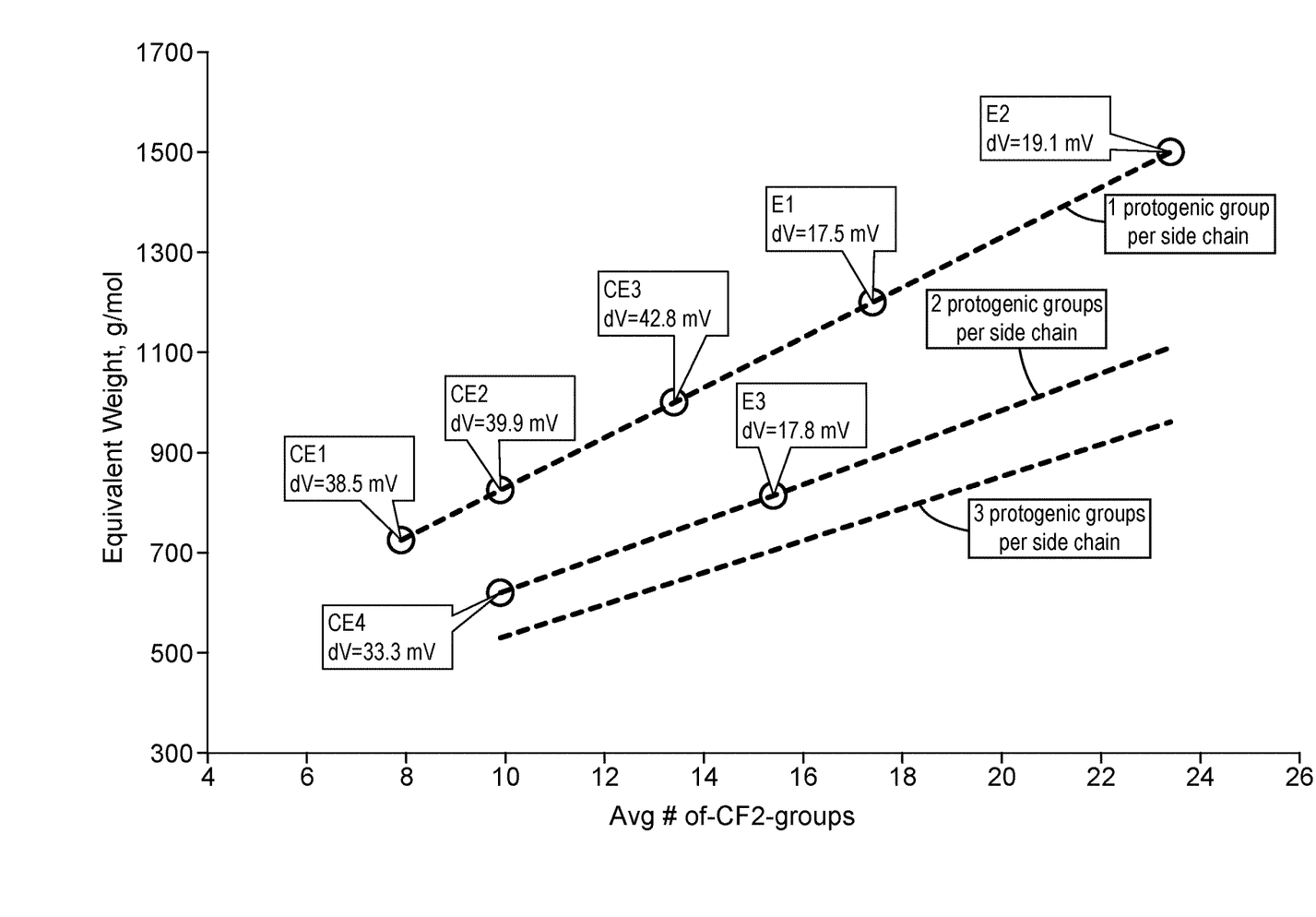
FIG. 1 is a plot of equivalent weight versus the average number of —$CF_2$— groups between first side chains. Shown in the plot are data points for a fluorinated ionomer having one protogenic group per side chain, two data points for a fluorinated ionomer having two protogenic groups per side chain and extrapolated lines for ionomers with one protogenic group per side chain and two protogenic groups per side chain. Also shown is a line showing roughly where ionomers having three protogenic groups per side chain would be.

For ideal performance as an electrode, the ionomers of use in an electrode should fall in the lower right quadrant of FIG. 1, namely having gains in conductivity and in activity. In one embodiment, the equivalent weight of the ionomer is at least 600, 700, 750, or even 800; and not greater than about 1000, 1200, or even 1500. In one embodiment, ionomer has an equivalent weight of at least 350 g/mol and less than 928 g/mol. However, the equivalent weight can depend on the protogenic groups in each side chain. For example, in one embodiment, the ionomer comprises at least one bis(sulfonyl)imide and the ionomer has an equivalent weight of at least 350 g/mol and at most 1100 g/mol. In another embodiment, the ionomer comprises at least one sulfonic acid or salt thereof and the ionomer has an equivalent weight of at least 1100 g/mol and at most 1500 g/mol.

Exemplary embodiment include, but are not limited to, the following:

Embodiment one: Use of a highly fluorinated ionomer to reduce poisoning of a metal catalyst in an electrochemical cell electrode, wherein the metal catalyst comprises at least one of platinum, ruthenium, iridium, and alloys and combinations thereof, and an at least highly fluorinated ionomer comprising a polymer backbone and a plurality of first side chains pendant therefrom, wherein the first side chain comprises at least one protogenic group, wherein the protogenic group is selected from a sulfonic acid, a bis(sulfonyl)imide, a sulfonamide, a sulfonyl methide, and salts and combinations thereof, and wherein the polymer backbone comprises an average of at least 14 carbon atoms between adjacent first side chains along the polymer backbone.

Embodiment two: Use according to embodiment one, wherein the first side chain comprises at least two protogenic groups.

Embodiment three: Use according to embodiment one, wherein the first side chain is $-O-(Rf)-SO_3Y$ wherein Rf is a divalent perfluorinated alkyl group, optionally comprising at least one ether; and Y is H or a suitable counterion.

Embodiment four: Use according to embodiment three, wherein the first side chain is $-O-(CF_2)_m-SO_3Y$ wherein m is 2, 3, 4, 5, or 6 and Y is H or a suitable counterion.

Embodiment five: Use according to embodiment three, wherein the first side chain is —O—[$CF_2CF(CF_3)O]_x$—$CF_2$—[$CF_2$]$_y$—$SO_3Y$ wherein x is 0-3; y is 1-4; and Y is H or a suitable counterion.

Embodiment six: Use according to any one of embodiments one to three, wherein the first side chain is —O—($CF_2$)$_m$O—CF—[$CF_2SO_3Y$]$_2$ wherein m is 2, 3, 4, 5, or 6; and Y is H or a suitable counterion.

Embodiment seven: Use according to any one of the previous embodiments, wherein at least highly fluorinated ionomer has an equivalent weight of less than 928 g/mol.

Embodiment eight: Use according to any one of the previous embodiments, wherein the at least highly fluorinated ionomer has an ionic conductivity of at most 100 mS/cm at 50% relative humidity and at 80° C.

Embodiment nine: Use according to any one of the previous embodiments, wherein the at least highly fluorinated ionomer comprises at least one bis(sulfonyl)imide and the at least highly fluorinated ionomer has an equivalent weight of at least 350 g/mol.

Embodiment ten: Use according to any one of embodiments one to eight, wherein the at least highly fluorinated ionomer comprises at least one sulfonic acid or salt thereof and the at least highly fluorinated ionomer has an equivalent weight of at least 1100 g/mol.

Embodiment eleven: Use according to any one of the previous embodiments, wherein the at least highly fluorinated ionomer comprises at least one second side chain, wherein the second side chain is not protogenic.

Embodiment twelve: Use according to embodiment eleven, wherein the second side chain comprises at least one of a perfluorinated alkyl ether, a perfluorinated alkyl polyether, and a perfluorinated alkyl group.

Embodiment thirteen: Use according to any one of the previous embodiments, wherein the metal catalyst is disposed on a support.

Embodiment fourteen: Use according to embodiment thirteen, wherein the support is at least one of carbon particles, acicular particles, and a metal organic framework.

Embodiment fifteen: Use according to any one of the previous embodiments, wherein a ratio of the at least highly fluorinated ionomer to the metal catalyst is at least 0.01 to at most 20 by mass.

Embodiment sixteen: A coating composition comprising:
(a) a metal catalyst, wherein the metal catalyst comprises at least one of platinum, ruthenium, iridium, and alloys and combinations thereof,
(b) an at least highly fluorinated ionomer comprising a polymer backbone and a plurality of first side chains pendant therefrom, wherein the first side chain comprises at least one protogenic group, wherein the protogenic group is selected from a sulfonic acid, a bis(sulfonyl)imide, a sulfonamide, a sulfonyl methide, and salts and combinations thereof, and wherein the polymer backbone comprises an average of at least 14 carbon atoms between adjacent first side chains along the polymer backbone; and
(c) a solvent.

Embodiment seventeen: The composition according to embodiment sixteen, wherein the first side chain comprises at least two protogenic groups.

Embodiment eighteen: The composition according to embodiment sixteen, wherein the first side chain is —O—(Rf)—$SO_3Y$ wherein Rf is a divalent perfluorinated alkyl group, optionally comprising at least one ether; and Y is H or a suitable counterion.

Embodiment nineteen: The composition according to embodiment eighteen, wherein the first side chain is —O—($CF_2$)$_m$—$SO_3Y$ wherein m is 2, 3, 4, 5, or 6 and Y is H or a suitable counterion.

Embodiment twenty: The composition according to embodiment eighteen, wherein the first side chain is —O—[$CF_2CF(CF_3)$]O]X—$CF_2$—[$CF_2$]$_y$—$SO_3Y$ wherein x is 0-3; y is 1-4; and Y is H or a suitable counterion.

Embodiment twenty-one: The composition according to any one of embodiments sixteen to seventeen, wherein the first side chain is —O—($CF_2$)$_m$—O—CF—[$CF_2SO_3Y$]$_2$ wherein m is 2, 3, 4, 5, or 6; and Y is H or a suitable counterion.

Embodiment twenty-two: The composition according to any one of embodiments sixteen to twenty-one, wherein the at least highly fluorinated ionomer has an equivalent weight of less than 928 g/mol.

Embodiment twenty-three: The composition according to any one of embodiments sixteen to twenty-two, wherein the at least highly fluorinated ionomer has an ion conductivity of at most 100 mS/cm at 50% relative humidity and at 80° C.

Embodiment twenty-four: The composition according to any one of embodiments sixteen to seventeen, and twenty-two to twenty-three, wherein the at least highly fluorinated ionomer comprises at least one bis(sulfonyl)imide and the at least highly fluorinated ionomer has an equivalent weight of at least 350 g/mol.

Embodiment twenty-five: The composition according to any one of embodiments sixteen to twenty-three, wherein the at least highly fluorinated ionomer comprises at least one sulfonic acid or salt thereof and the at least highly fluorinated ionomer has an equivalent weight of at least 1100 g/mol.

Embodiment twenty-six: The composition according to any one of embodiments sixteen to twenty-five, wherein the at least highly fluorinated ionomer comprises at least one second side chain, wherein the second side chain is not protogenic.

Embodiment twenty-seven: The composition according to embodiment twenty-six, wherein the second side chain comprises at least one of a perfluorinated alkyl ether, a perfluorinated alkyl polyether, and a perfluorinated alkyl group.

Embodiment twenty-eight: The composition according to any one of embodiments sixteen to twenty-seven, wherein the metal catalyst is disposed on a support.

Embodiment twenty-nine: The composition according to embodiment twenty-eight, wherein the support is at least one of carbon particles, acicular particles, and a metal organic framework.

Embodiment thirty: The composition according to any one of embodiments sixteen to twenty-nine, wherein the composition comprises a ratio of the at least highly fluorinated ionomer to the metal catalyst is at least 0.01 to at most 20 by mass.

Embodiment thirty-one: The composition according to any one of embodiments sixteen to thirty, wherein the composition further comprises an additive.

Embodiment thirty-two: The composition of embodiment thirty-one, wherein the additive is at least one of carbon particles, acicular particles, and a metal organic framework.

Embodiment thirty-three: The composition of any one of embodiments sixteen to thirty-two, wherein the solvent comprises at least one of an alcohol, a polyalcohol, a ketone, water, a fluorinated solvent, and combinations thereof.

Embodiment thirty-four: The composition of any one of embodiments sixteen to thirty-three, wherein the composition comprises 1 to 40 wt % solids.

Embodiment thirty-five: An article comprising a substrate with an electrode coating thereon, wherein the electrode coating comprises
(a) a metal catalyst phase, wherein the metal catalyst phase comprises at least one of platinum, ruthenium, iridium, and alloys and combinations thereof; and
(b) an at least highly fluorinated ionomer layer comprising a polymer backbone and a plurality of first side chains pendant therefrom, wherein the first side chain comprises at least one of a sulfonic acid, a bis(sulfonyl) imide, a sulfonamide, a sulfonyl methide, and salts and combinations thereof, and wherein the polymer backbone comprises an average of at least 14 carbon atoms between adjacent first side chains along the polymer backbone.

Embodiment thirty-six: The article of embodiments thirty-five, wherein the substrate is a gas diffusion layer, a liner, or an ion conductive membrane.

Embodiment thirty-seven: The article of any one of embodiments thirty-five to thirty-six, wherein the electrode coating has a thickness of at least 0.1 micron and at most 100 microns.

Embodiment thirty-eighty: Use of the article described in any one of embodiments thirty-five to thirty-seven as a cathode in a fuel cell, wherein the catalyst comprises platinum.

Embodiment thirty-nine: Use of the article described in any one of embodiments thirty-five to thirty-seven as an anode in an electrolyzer, wherein the catalyst is substantially free of platinum.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Missouri, or may be synthesized by conventional methods.

These abbreviations are used in the following examples: A=amps, cm=centimeters, g=grams, ° C.=degrees Celsius, RH=relative humidity, mA=milliAmps, mol=moles, sccm=standard cubic centimeters per minute, and V=volt.

TABLE 1

Table of Materials

| Designation | Description | Source |
| --- | --- | --- |
| PFSA-725 | Perfluorosulfonic acid, equivalent weight 725 eq/mol | Copolymers of tetrafluoroethylene (TFE) and $FSO_2$—$CF_2CF_2CF_2CF_2$—O—CF=$CF_2$, described in U.S. Pat. No. 7,348,088, U.S. Pat. No. 6,624,328, and U.S. patent application Ser. No. 10/322,254. |
| PFSA-825 | Perfluorosulfonic acid, equivalent weight 825 eq/mol | |
| PFSA-1000 | Perfluorosulfonic acid, equivalent weight 1000 eq/mol | |
| PFSA-1200 | Perfluorosulfonic acid, equivalent weight 1200 eq/mol | |
| PFSA-1500 | Perfluorosulfonic acid, equivalent weight 1500 eq/mol | |
| PFIA-620 | Perfluoroimide acid, equivalent weight 620 eq/mol | Prepared as described in U.S. Pat. No. 9,419,300B2, Col. 15, Lines 1-53, from copolymers of TFE and $FSO_2$—$CF_2CF_2CF_2CF_2$—O—CF=$CF_2$ of equivalent weights of 800 EW and 1100 EW, respectively. After the reactions, these materials were titrated to give 620 EW and 814 EW, respectively. |
| PFIA-814 | Perfluoroimide acid, equivalent weight 814 eq/mol | |
| 10EA50E | 50-wt % Pt deposited on a graphitized carbon support | Tanaka Kikinzoku Kogyo K.K, Tokyo, Japan |
| 10V50E | 50-wt % Pt deposited on Vulcan carbon | Tanaka Kikinzoku Kogyo K.K, Tokyo, Japan |
| 3M 2979 | Hydrophobized gas diffusion layer (GDL) carbon paper with a microporous layer | Available under the trade designation "GDL 2979 GAS DIFFUSION LAYER" from 3M Company, St. Paul, MN. |
| Ionomer membrane | 825 g/mol equivalent weight polymeric perfluorosulfonic acid proton exchange membrane (PEM), 20 micrometers thick | Prepared as described in the PFSA-1000 film preparation below, except that the equivalent weight of the ionomer was 825 g/mol. |

Membrane Production for Ionic Conductivity Testing:

A membrane of PFSA-725 was prepared by dispersing ionomer powder, obtained under the trade designation "725 EW PFSA IONOMER" from 3M Company, in an ethanol/water solvent mixture of about 75% ethanol/25% water at approximately 33% solids by mixing the ionomer and solvent in a bottle that was rolled slowly overnight to obtain a homogenous dispersion. Membranes were prepared by casting the dispersion onto a 2 mil (51 micrometer) thick polyimide film (obtained under the trade designation "KAPTON", available from DuPont (Wilmington, DE)) upon a glass substrate using a 4 inch (10 cm) wide microfilm applicator (obtained from Paul N. Gardner Company, Inc., Pompano Beach, FL) using a wet gap thickness of 8 mils (200 micrometers) which was uniform across the 4 inch width of the coating. The wet coating was dried under an aluminum pan covering in a forced air oven at 120° C. for 30 minutes. The coated polyimide was transferred from the glass substrate to an aluminum substrate with aluminum pan covering and heated to 140° C. for 15 minutes and ramped to 160° C. to anneal with a 10-minute hold, to produce a 30 micrometer thick proton exchange membrane. The film was removed from the polyimide and titrated according to the method below.

Membranes of PFSA-825, PFSA-1200, PFIA-620, and PFIA-814 were prepared following the procedure described above, except solvent systems and polymer solids of dispersions are as indicated in Table 2. Coating thicknesses and drying and annealing temperatures were as disclosed in the table, if different than described in the procedure above.

TABLE 12

Preparation of Films for Ionic Conductivity Measurements

| Ionomer Name | Notch Bar Coating Gap in mil (micron) | Solvent System (w/w) | Dispersion Wt % | Drying/Annealing |
|---|---|---|---|---|
| PFSA-725 | 8 (203) | 75/25 EtOH/H2O | 33.0 | 120° C. for 30 min, then 140° C. for 15 min, followed by 160° C. for 10 min |
| PFSA-825 | 10 (250) | 75/25 EtOH/H2O | 29.3 | 120° C. for 30 min, then 145° C. for 15 min, followed by 200° C. for 10 min |
| PFSA-1000 | — | 75/25 EtOH/H2O | 34.7 | Held at 3 minutes each sequentially: 50° C., 100° C., 120° C., 145° C., 200° C. |
| PFSA-1200 | 10 (250) | 66/34 nPA/H2O | 26.8 | 120° C. for 10 min, then 200° C. for 10 min |
| PFIA-620 | 7 (177) | 75/25 EtOH/H2O | 31.1 | 120° C. for 30 min, then 140° C. for 15 min, then 200° C. for 10 min |
| PFIA-814 | 8 (203) | 70/30 EtOH/H2O | 30.0 | 120° C. for 20 min, then 160° C. for 15 min, followed by 200° C. for 3 min |

TABLE 3

| Ionomer Name | Equivalent Weight (g/mol) | Dry Thickness (microns) |
|---|---|---|
| PFSA-725 | ~725 | 30 |
| PFSA-825 | ~825 | 24 |
| PFSA-1000 | ~1000 | 56 |
| PFSA-1200 | ~1200 | 38 |
| PFIA-620 | 620 | 22 |
| PFIA-814 | 814 | 30 |

PFSA-1000 Film Preparation

A membrane or film of PFSA-1000, a 1000 g/mol equivalent weight perfluorosulfonic acid ionomer of the type described in U.S. Pat. No. 7,348,088, was prepared from a dispersion of the ionomer in a solvent and polymer solids as described in Table 1. The solution of ionomer was coated onto a 2 mil (51 micrometer) polyimide liner (KAPTON, available from DuPont (Wilmington, DE)) at a constant flow rate using a coating die and a line speed of about 1 meter per minute, with a target dry thickness of 30 micrometers, using a pilot-scale coater manufactured by Hirano Entec Ltd. (Nara, Japan) having four drying zones arranged sequentially in a down-web direction and set to 50° C., 100° C., 120° C., and 145° C., respectively. The film was then subjected to a second heat treatment at the temperatures described in Table 1.

Titration of Films (EW Measurement)

Acid-form ionomer membranes of 20-60 micrometer thickness and approximately 0.5-0.6 g were dried at 120° C. for 20 minutes, were weighed, and were added to 50 g 1 M NaCl(aq). The membranes were allowed to ion exchange for more than 4 hours, with gentle agitation by rolling or shaking in a bottle. 20 mL aliquots of NaCl(aq) solution, containing generated HCl, were titrated with 0.1-0.03 M NaOH to determine the ion exchange capacity of the film of known mass.

Bulk Film Proton Conductivity Test Method:

The films produced above were measured using a standard, in-plane, 4-point probe conductivity apparatus with platinum electrodes. The cell was electrically connected to a potentiostat (Model 273, Princeton Applied Research, Oak Ridge, Tenn.) and an Impedance/Gain Phase Analyzer (SI 1260, Schlumberger). AC impedance measurements were performed using ZPLOT and ZVIEW software (Scribner Associates Inc., Southern Pines, NC). Temperature and relative humidity (RH) were controlled with a constant humidity oven (Model 1000H from Test Equity, Moorpark, CA). In the test method, an initial condition of 70% RH (relative humidity) at a set temperature of 80° C. was selected, and then the % RH was stepped down incrementally to 25% RH, and then stepped back up to 90% RH. Each condition was maintained for 90 minutes. Test results are included below.

Rotating Disk Electrode (RDE) Procedure

Experimental Procedure for Ionomer/Catalyst Interaction Study Using RDE

All references to de-ionized (DI) water imply ultrapure (18.2 Mohm) water (GenPure UV-TOC xCAD plus, Thermo Scientific, Waltham MA). All potentials given are relative to the reversible hydrogen electrode (RHE) unless otherwise noted.

All chemicals were used as-received. Perchloric acid solutions were prepared from Veritas double distilled 70% reagent (GFS Chemicals, Powell, OH) and measured directly into perfluoroalkoxy alkane (PFA) containers (Savillex, Eden Prairie MN) to minimize contamination during transfers. Ionomer solutions were prepared with 99.99995% N—N-Dimethylformamide (DMF) available under the trade designation TRACESELECT (FLUKA, Honeywell Specialty Chemicals Seelze GmbH, Seelze, Germany) and HPLC/Spectrophotometric grade 200 proof ethanol (Sigma-Aldrich, St. Louis, MO).

Glassware and Solution Preparation. All experimental glassware for the electrochemical cell was first cleaned using an aqueous Alconox (Alconox Inc., White Plains NY) detergent solution (0.5% by mass) to remove contaminants and rinsed thoroughly with DI water. The glassware was then immersed in a 96% sulfuric acid (Sigma Aldrich) bath for a period of 24 hours. The glassware was then transferred to a sulfuric acid bath with a glassware cleaner available under the trade designation NOCHROMIX (Godax Laboratories, Bethesda, MD) and left fully immersed for 24 hours. The NOCHROMIX solution was prepared by dissolving one commercial packet with 2.5 L of 96% sulfuric acid. The glassware was then transferred into a DI bath and left fully immersed for 24 hours to rinse the sulfuric acid. This step was repeated once more with fresh DI water. After rinsing, the glassware was transferred to a DI water bath and rigorously boiled for a period of 8 hours six separate times over the course of a week. The DI water was replaced between each boiling step. In addition to these pre-cleaning steps, the glassware was boiled between experiments for at least 8 hours in fresh DI water.

RDE Electrode Cleaning. Polycrystalline platinum (Pt-Poly) RDE electrodes (5.0 mm disk OD, 15.0 mm OD PEEK shroud, Pine Research Instrumentation, Durham, NC) were cleaned via a two-step mechanical polishing process on a 8" diameter MicroCloth polishing pad (Buehler, Lake Bluff IL): the first step for 60 seconds using a 0.05 μm alumina polishing compound (Buehler); and the second step for 60 seconds using no polishing compound. In both steps, the MicroCloth pad was first wetted with DI water. The electrodes were rinsed thoroughly with DI water for 60 seconds following each mechanical polishing. After mechanical polishing, the electrodes were mounted onto the rotator and immersed into the electrochemical cell filled with a 0.1 M $HClO_4$ solution de-aerated for 30 minutes using ultra high purity (99.999%) $N_2$ (Oxygen Service Company, Saint Paul, MN). The electrodes were then electrochemically cleaned via potential cycling between 0.04 and 1.4 V vs. RHE (reference hydrogen electrode) at a scan rate of 100 mV/s and electrode rotation rate of 1600 rpm (revolutions per minute) for at least 30 minutes (approximately 66 full cycles) with a constant bubbling of $N_2$.

Ionomer Solution Preparation and Coating. A 20 wt % dimethyl formamide (DMF) aqueous solution was prepared to serve as dilution solvent. Ionomer solutions were prepared by dissolving the chosen ionomer powder in 75:25 (wt %) ethanol:water to form 1 wt % master solutions. The 1 wt % master solutions were then used to create dilute (0.0075 wt %) solutions using the 20 wt % DMF solution as solvent. All solutions (master and dilute) were thoroughly mixed on a jar roller for 24 hours before use.

The ionomer was dropcast onto the Pt-Poly electrodes after electrochemical cleaning to form a continuous film. 15 microliters of the 0.0075 wt % ionomer solution in DMF/$H_2O$ was dropped onto the surface via a microliter pipette. The electrode was then transferred to an oven and dried at 80° C. under a $N_2$ atmosphere for 20 minutes to remove ionomer solvent. The temperature of the oven was then steadily increased to 120° C. over a period of 20 minutes to improve mechanical stability of the ionomer film. Assuming a density of 1.5 $g/cm^3$ for perfluorosulfonic acid (PFSA) ionomers, the resulting film thickness was calculated to be on the order of 40 nm.

Electrochemical Characterization

Electrodes were characterized by performing electrochemical surface area (ECSA) and oxygen reduction reaction (ORR) experiments in 0.1 M $HClO_4$ using custom electrochemical glassware fabricated in-house by 3M Company. An $H_2$/Pt electrode with Luggin capillary mounted such that the capillary tip was ~1 cm below the RDE electrode served as reference electrode. The design of the reference electrode was such that a constant stream of ultra-high purity $H_2$ gas bubbled over the surface of a coiled 0.3 mm diameter x 10 cm long Pt wire (Alfa Aesar, Tewksbury MA). The capillary tip was made as small as possible to minimize $H_2$ crossover into the cell. A 25×25 mm woven Pt mesh (0.34 mm thick) and 10 cm segment of 0.6 mm diameter Pt wire (Alfa Aesar) served as the counter electrode. An Autolab PGSTAT302M potentiostat (Metrohm Autolab, Herisau, Switzerland) with FRA32M (impedance spectroscopy) and SCAN250 (analog scan) modules was used for all electrochemical measurements.

ECSA scans were performed using cyclic voltammetry (CV) under an $N_2$ blanket with no rotation following the 30 minute electrochemical cleaning procedure. The initial potential was +0.3 V and the device was scanned in the anodic direction to +1.4 V, followed by a cathodic scan to +0.04 V at 50 mV/s. This cycle was repeated three times. The final scan data was utilized to calculate surface area via integration of the $H_2$ underpotential deposition region of the cathodic sweep assuming a specific charge of 210 microcoulombs/$cm^2_{Pt}$.

Immediately following ECSA characterization, ORR scans were performed using linear sweep voltammetry (LSV). First, a background scan was performed under an $N_2$ blanket at 1600 RPM from −0.01 to +1.0 V at 20 mV/s with iR compensation turned off. The gas was switched to $O_2$ and the solution was bubbled via a glass frit for 7 minutes to ensure complete oxygenation. A valve on the glassware apparatus was then switched to form an $O_2$ blanket to measure the uncompensated resistance of the solution. The iR compensation value was calculated by performing the Autolab hardware current interrupt technique at a potential of 0.2 V (where the ORR current is in the limiting current regime). A current interrupt measurement is performed by applying a constant potential and then triggering a current interrupt circuit while measuring the potential decay. From the measured potential decay, the uncompensated resistance value ($R_u$) is determined, using a linear and an exponential regression. Three successive interrupt measurements were performed, and the resulting linear regression values were averaged ($R_{avg}$). Immediately following the current interrupt technique, the LSV scan at 1600 RPM from −0.01 to +1.0 V at 20 mV/s was repeated using identical conditions as with the background scan except with iR compensation turned on. The iR compensation was set to a value of $0.95*R_{avg}$. After the LSV scans were completed, the gas was switched back to $N_2$ and allowed to bubble through the frit for at least 10 minutes before moving on to the next experiment (typically a repeat using a second electrode).

Measuring Activity Effect of Ionomer Powders:

To compare the catalyst mass activity in the presence of different ionomers, the voltage at a specific current measured using the bare Pt-Poly electrode is compared to the voltage obtained at the same current after coating the electrode with ionomer. This data is obtained during the LSV (linear sweep voltammetry) scans as outlined above. The specific current to be used is determined by taking the limiting current—the maximum current between +0.2 and +0.6 V where ORR current is limited by mass transport—and multiplying it by 0.5. The measured voltage difference corresponding to the ½ limiting current between the bare and ionomer-coated scans is denoted delta V (ΔV). In all cases, the resulting raw voltage at ½ limiting current is in the kinetic regime, where ORR current is not limited by mass transport but rather by kinetics of the reduction reaction. It is this region where the effects of the ionomer coating become readily apparent and thus serves as an adequate analogue of actual fuel cell performance. Typically, this voltage is between +0.8 and +0.9 V vs RHE.

Comparative Example 1 (CE1)

A rotating disk electrode was prepared for measurement as described in Rotating Disk Electrode (RDE) Procedure above, using a perfluorosulfonic acid (PFSA) polymer with an equivalent weight of 725 g/mol as the chosen ionomer powder. This material has an average of 7.9 —$CF_2$- units between monomers containing protogenic sidechains, as shown in Table 2. The activity loss was measured by the process described in the Measuring Activity of Ionomer Powders section above. The measurement was carried out on four samples, and the results were averaged.

Comparative Example 2 (CE2)

This test was carried out as in Comparative Example 1, except that the ionomer powder was PFSA with an equivalent weight of 825 g/mol. Four samples were measured and averaged. This material has an average of 9.9 —$CF_2$- units between monomers containing protogenic sidechains.

Comparative Example 3 (CE3)

This test was carried out as in Comparative Example 1, except that the ionomer powder was PFSA with an equivalent weight of 1000 g/mol. Four samples were measured and averaged. This material has an average of 13.4 —CF2- units between monomers containing protogenic sidechains.

Comparative Example 4 (CE4)

This test was carried out as in Comparative Example 1, except that the ionomer powder was perfluoroimide acid (PFIA) with an equivalent weight of 620 g/mol, synthesized from a sulfonyl fluoride precursor of 800 g/mol. Four samples were measured and averaged. This material has an average of 9.4 —CF2- units between monomers containing protogenic sidechains.

Example 1 (E1)

This test was carried out as in Comparative Example 1, except that the ionomer powder was PFSA with an equivalent weight of 1200 g/mol. Two samples were measured and averaged. This material has an average of 17.4 —CF2- units between monomers containing protogenic sidechains.

Example 2 (E2)

This test was carried out as in Comparative Example 1, except that the ionomer powder was PFSA with an equivalent weight of 1500 g/mol. Four samples were measured and averaged. This material has an average of 23.4 —CF2- units between monomers containing protogenic sidechains.

Example 3 (E3)

This test was carried out as in Comparative Example 1, except that the ionomer powder was PFIA with an equivalent weight of 814 g/mol synthesized from a sulfonyl fluoride precursor of 1100 g/mol. Two samples were measured and averaged. This material has an average of 15.4 —CF2- units between monomers containing protogenic sidechains.

As shown in Table 4 below are the average —CF2- units between first side chains, the equivalent weight of the ionomer, its activity loss, and conductivity at 50% RH and 90% RH for CE1-CE4 and E1-E3.

Comparison of Ionomers in Fuel Cell Cathodes

The cathode catalyst mass activity was measured in two hydrogen fuel cells that were essentially identical, with the exception that the ionomer in one cathode electrode was PFSA-825 and the other was PFSA-1200.

Catalyst Mass Activity Testing Protocol

Each ionomer was incorporated into the cathode of a fuel cell, as described in more detail below. The cell temperature was set to 80° C., with inlet gases humidified to 100% RH.

Initially gas flows were 800 sccm $H_2$ (anode) and 1800 sccm $N_2$ (cathode) while the cell was held at open circuit for 5 minutes. The cathode gas was switched to $O_2$ and 1 A/cm$^2$ was applied to the cell for 30 seconds. After that, voltages were measured at current densities of 0.01, 0.02, 0.03 0.05, 0.075, 0.10, 0.125 and 0.150 A/cm$^2$ for 15 seconds. Current densities of 0.20, 0.25, 0.30 A/cm$^2$ were measured for 30 seconds. At that point, high frequency resistance (HFR) was turned on to measure the resistance loss of the membrane and anode/membrane and cathode/membrane interfaces. Impedance between 10 Hz and 10,000 Hz was measured and the 0-point intercept value was attained on the real axis. In the same manner, voltages and HFR resistance values were measured at 0.40, 0.50, 0.70, and 1.0 A/cm$^2$ for 60 seconds at each point.

All voltages were then adjusted to remove resistance loss by first averaging the HFR values for data between 0.40 and 1.0 A/cm$^2$. The second step was adjusting all measured voltages measured between 0.01 and 1.0 A/cm$^2$ for resistance loss as follows: V[IR-free]=V[measured at each specific current density]+HFR[Ohm*cm$^2$]*Current density[A/cm$^2$].

Once V[IR-free] vs. current density was obtained, the current density at which V[IR-free] crossed 0.9 V was determined. This value was divided by the area loading (mg Pt/cm$^2$) to attain the final mass activity in A/mgPt.

TABLE 5

Fuel cell construction

| Location | Property | PFSA-825 fuel cell part | PFSA-1200 fuel cell part |
|---|---|---|---|
| ANODE | Catalyst type | 10EA50E | 10EA50E |
| ANODE | Metal Loading, mg Pt/cm$^2$ | 0.1 | 0.1 |
| ANODE | Ionomer type | PFSA-825 | PFSA-825 |
| ANODE | Ionomer to catalyst ratio | 0.8 | 0.8 |

TABLE 4

Ionomers used as examples and comparative examples

| Example | Ionomer Name | Average -CF$_2$- units between first side chains | Equivalent Weight (g/mol) | Activity Loss (ΔV) | Conductivity (mS/cm) 50% RH | Conductivity (mS/cm) 90% RH |
|---|---|---|---|---|---|---|
| CE1 | PFSA-725 | 7.9 | 725 | 38.5 ± 4.5 | 76.1 ± 3.1 | 285.6 ± 18.2 |
| CE4 | PFIA-620 | 9.4 | 620 | 33.3 ± 2.5 | 100.9 ± 7.1 | 329.8 ± 25.1 |
| CE2 | PFSA-825 | 9.9 | 825 | 39.9 ± 1.6 | 61.6 ± 0.4 | 251.1 ± 15.7 |
| CE3 | PFSA-1000 | 13.4 | 1000 | 42.8 ± 7.4 | 36.1 ± 0.9 | 147.9 ± 3.2 |
| E3 | PFIA-814 | 15.4 | 814 | 17.8 ± 1.5 | 57.6 ± 5.68 | 213.6 ± 25.8 |
| E1 | PFSA-1200 | 17.4 | 1200 | 17.5 ± 7.1 | 23.2 ± 2.5 | 101.2 ± 11.7 |
| E2 | PFSA-1500 | 23.4 | 1500 | 19.1 ± 6.9 | NM | NM |

NM means not measured

TABLE 5-continued

Fuel cell construction

| Location | Property | PFSA-825 fuel cell part | PFSA-1200 fuel cell part |
|---|---|---|---|
| ANODE | GDL | 3M 2979 | 3M 2979 |
| ANODE | GDL compression | 10% | 10% |
| MEMBRANE | 3M825EW, 20 micrometer thickness | | |
| CATHODE | Catalyst type | 10V50E | 10V50E |
| CATHODE | Metal Loading, mgPt/cm2 | 0.2 | 0.2 |
| CATHODE | Ionomer type | PFSA-825 | PFSA-1200 |
| CATHODE | Ionomer to catalyst ratio | 0.9 | 0.9 |
| CATHODE | GDL | 3M 2979 | 3M 2979 |
| CATHODE | GDL compression | 10% | 10% |

General Electrochemical Cell Construction

All tests described below were done in the same electrochemical cell, using the same type of ion exchange membrane and anode construction. The cathode constructions were varied as described below in each specific Example or Comparative Example.

Anode Catalyst Layer Decal Preparation

A dispersed catalyst ink composition was made comprising carbon-supported catalyst 10EA50E and PFSA-825 ionomer. The ratio of ionomer to the amount of carbon in the catalyst was 8/10. The catalyst ink solution was coated on the silicone side of a silicone coated polyethylene terephthalate (PET) release liner film with a Mayer rod, then dried at 130° C. for 10 minutes to form a cathode catalyst layer decal.

Catalyst Coated Membrane (CCM) Preparation

Ionomer membrane was placed between the anode catalyst layer decal prepared above and a cathode catalyst layer decal (as described in the Comparative Examples and Examples below), with the liners on the outside of the construction and the catalysts facing the Ionomer membrane. The construction was hot roll laminated using heated steel 6 inch (15.2 cm) diameter rollers heated to 325° F. (163° C.) at a roller speed of 1.2 feet per minute (0.37 m/s) with the rollers compressed together with 625 pounds of force per lineal inch (110 kilograms per lineal cm), calculated from the width of the Ionomer membrane. The silicone coated PET release liner was removed from the construction immediately after lamination to form a CCM.

Assembling Single Cell Fuel Test Station

The CCM was installed between two GDLs and placed directly into a 50 cm² single fuel cell (obtained under the trade designation "50 CM² CELL HARDWARE" (50SCH) from Fuel Cell Technologies, Albuquerque, NM), with quad serpentine graphite flow fields, and with gaskets selected to give 10% compression of the gas diffusion layers. After assembly, the test cell was connected to a test station (obtained under the trade designation "SINGLE FUEL CELL TEST STATION" from Fuel Cell Technologies, Inc.) A supply of hydrogen gas was provided to the anode side and air was supplied to the cathode side. The test station was used to control the applied cell voltage or current density, the hydrogen gas and air gas pressures, flow rates, and water vapor content (relative humidity), and the test cell temperature.

Electrochemical Cell Testing Procedures

Cell Conditioning

After assembling the test cell and connecting it to the test station, each CCM was subjected to a conditioning or "break-in" period before performance testing. A hydrogen stream was connected to the anode side of the test cell and air was connected to the cathode side of the test tell. The test cell was operated at 60° C. and 100% relative humidity for both the $H_2$ and air streams at a hydrogen flow rate of 800 sccm and air flow at 1800 sccm. Potentiodynamic scans of cell voltage from 0.9 V to 0.3 V were run repeatedly until steady state power output was reached.

Comparative Example 5

A cathode decal was prepared by forming a dispersed catalyst ink composition comprising carbon-supported catalyst 10V50E and PFSA-825 ionomer. The ratio of ionomer to the amount of carbon in the catalyst was 9/10. The catalyst ink solution was coated on the silicone side of a silicone coated polyethylene terephthalate (PET) release liner film with a Mayer rod, then dried at 130° C. for 10 minutes to form a cathode catalyst layer decal. The cathode decal was laminated with an Ionomer membrane and an anode decal to form a CCM as described above. After cell conditioning, the cell was subjected to the Catalyst Mass Activity Testing Protocol as described above. The procedure was repeated 1 time per sample and multiple samples were tested to yield an average value with a standard deviation.

Example 4

A cathode decal was prepared by forming a dispersed catalyst ink composition comprising carbon-supported catalyst 10V50E and PFSA-1200 ionomer. The ratio of ionomer to the amount of carbon in the catalyst was 9/10. The catalyst ink solution was coated on the silicone side of a silicone coated polyethylene terephthalate (PET) release liner film with a Mayer rod, then dried at 130° C. for 10 minutes to form a cathode catalyst layer decal. The cathode decal was laminated with an Ionomer membrane and an anode decal to form a CCM as described above. After cell conditioning, the cell was subjected to the Catalyst Mass Activity Testing Protocol as described above. The procedure was repeated 1 time per sample and multiple samples were tested to yield an average value with a standard deviation. The measured catalyst mass activities for Comparative Example 5 and Example 4 are provided in table 6 below, showing Example 4 to have more activity.

TABLE 6

| | IR-corrected Mass Activity, A/mgPt | Standard Deviation |
|---|---|---|
| Comparative Example 5 | 0.173 | 0.029 |
| Example 4 | 0.269 | 0.016 |

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. A coating composition comprising:
   (a) a metal catalyst, wherein the metal catalyst comprises at least one of platinum, ruthenium, iridium, and alloys and combinations thereof;
   (b) an at least highly fluorinated ionomer comprising a polymer backbone and a plurality of first side chains pendant therefrom, wherein the first side chain comprises at least two protogenic groups, wherein each protogenic group is selected from a sulfonic acid, a bis(sulfonyl)imide, a sulfonamide, a sulfonyl methide, and salts thereof, and wherein the polymer backbone comprises an average of at least 14 carbon atoms between adjacent first side chains along the polymer backbone; and (c) a solvent.

2. The composition according to claim 1, wherein the first side chain is —O—$(CF_2)_m$—O—CF—$[CF_2SO_3Y]_2$ wherein m is 2, 3, 4, 5, or 6; and Y is H or a counterion comprising an alkali metal, an alkaline earth metal, a transition metal, or combinations thereof.

3. The composition according to claim 1, wherein the at least highly fluorinated ionomer has an equivalent weight of less than 928 g/mol.

4. The composition according to claim 1, wherein the at least highly fluorinated ionomer has an ion conductivity of at most 100 mS/cm at 50% relative humidity and at 80° C.

5. The composition according to claim 1, wherein the at least highly fluorinated ionomer comprises at least one bis(sulfonyl)imide and the at least highly fluorinated ionomer has an equivalent weight of at least 350 g/mol.

6. The composition according to claim 1, wherein the at least highly fluorinated ionomer comprises at least one sulfonic acid or salt thereof and the at least highly fluorinated ionomer has an equivalent weight of at least 1100 g/mol.

7. The composition according to claim 1, wherein the at least highly fluorinated ionomer comprises at least one second side chain, wherein the second side chain is not protogenic.

8. The composition according to claim 1, wherein the metal catalyst is disposed on a support.

9. The composition according to claim 1, wherein the composition comprises a ratio of the at least highly fluorinated ionomer to the metal catalyst is at least 0.01 to at most 20 by mass.

10. The composition according to claim 1, wherein the composition further comprises an additive.

11. The composition according to claim 1, wherein the solvent comprises at least one of an alcohol, a polyalcohol, a ketone, water, a fluorinated solvent, and combinations thereof.

12. The composition according to claim 1, wherein the composition comprises 1 to 40 wt % solids.

13. An article comprising a substrate with an electrode coating thereon, wherein the electrode coating comprises
(a) a metal catalyst phase, wherein the metal catalyst phase comprises at least one of platinum, ruthenium, iridium, and alloys and combinations thereof; and
(b) an at least highly fluorinated ionomer layer comprising a polymer backbone and a plurality of first side chains pendant therefrom, wherein the first side chain comprises at least two protogenic groups, wherein each protogenic group is a sulfonic acid, a bis(sulfonyl) imide, a sulfonamide, a sulfonyl methide, or salts thereof, and wherein the polymer backbone comprises an average of at least 14 carbon atoms between adjacent first side chains along the polymer backbone, and optionally, wherein the substrate is a gas diffusion layer, a liner, or an ion conductive membrane.

14. The article of claim 13, wherein the electrode coating has a thickness of at least 0.1 micrometer and at most 100 micrometers.

15. The composition of claim 7, wherein the second side chain comprises at least one of a perfluorinated alkyl ether, a perfluorinated alkyl polyether, and a perfluorinated alkyl group.

16. The composition of claim 8, wherein the support is at least one of carbon particles, acicular particles, and a metal organic framework.

17. The composition of claim 10, wherein the additive is at least one of carbon particles, acicular particles, and a metal organic framework.

18. The article of claim 13, wherein the substrate is a gas diffusion layer, a liner, or an ion conductive membrane.

19. The coating of claim 1, wherein the first side chain comprises a plurality of protogenic groups.

20. The coating of claim 1, wherein the polymer backbone comprises an average of at least 16 carbon atoms between adjacent first side chains along the polymer backbone.

21. The coating of claim 1, wherein the polymer backbone comprises an average of no more than 24 carbon atoms between adjacent first side chains along the polymer backbone.

* * * * *